Sept. 1, 1953
C. A. YOUNG ET AL
2,650,634
LEAD-IN WIRE ORIENTING APPARATUS
Filed April 18, 1951
4 Sheets-Sheet 1

INVENTORS
HAROLD E. BAKER
CHARLES A. YOUNG
BY
ATTORNEY

INVENTORS
HAROLD E. BAKER
CHARLES A. YOUNG
BY Joseph C. Ryan
ATTORNEY

INVENTORS
HAROLD E. BAKER
CHARLES A. YOUNG
BY Joseph C. Ryan
ATTORNEY

Sept. 1, 1953           C. A. YOUNG ET AL          2,650,634
LEAD-IN WIRE ORIENTING APPARATUS
Filed April 18, 1951                                  4 Sheets-Sheet 4

INVENTORS
HAROLD E. BAKER
CHARLES A. YOUNG
BY Joseph C. Ryan
ATTORNEY

Patented Sept. 1, 1953

2,650,634

UNITED STATES PATENT OFFICE 2,650,634

LEAD-IN WIRE ORIENTING APPARATUS

Charles A. Young, Gloucester, and Harold E. Baker, Danvers, Mass., assignors to Sylvania Electric Products Inc., Salem, Mass., a corporation of Massachusetts Application April 18, 1951, Serial No. 221,594

6 Claims. (Cl. 153—2)

This invention relates to the manufacture of wired electrical devices and more particularly to the orientation of the lead-in wires of electrical devices during the manufacture thereof.

In the manufacture of many electrical devices, such as lamps, radio tubes and electronic devices, for example, it is necessary to orient the lead-in wires thereof in order to satisfactorily accomplish one or more of the manufacturing operations. In many cases, this orientation is performed by an operator. Since manual orientation of the lead-in wires is time consuming, the speed with which the manufacturing operation requiring this orientation may be accomplished is adversely affected. In the manufacture of fluorescent lamps, for example, the operator who loads the exhaust machine orients the lead-in wires in order to insure satisfactory effectuation of the "cathode break-down" and "lighting-up" operations which are performed on the exhaust machine. Since these two operations are accomplished by the passage of electric current through the lamp lead-in wires, it is essential that the lead-in wires be properly positioned to insure positive engagement thereof with electrical contacts on the machine.

An object of this invention is to orient the lead-in wires of electrical devices during the manufacture thereof.

Another object is to provide automatic means for effecting this orientation.

A further object is to provide equipment for manufacturing electrical devices with an attachment for automatically effecting lead-in wire orientation.

The foregoing objects and others are attained, in accordance with the principles of this invention, by locating a lead-in wire orientating apparatus transverse to the path through which electrical devices, having lead-in wires extending therefrom, are caused to travel. The lead-in wire orienting apparatus comprises one or more mechanisms which move into engagement with the lead-in wires and bend them to the desired pre-determined position. In the specific embodiment of the invention shown in the accompanying drawings and described below, the lead-in wire orienting apparatus is illustrated and described in connection with the orientation of the lead-in wires of a fluorescent lamp having an exhaust tube projecting therefrom. In this embodiment, the orienting operation is performed in three stages. In the first stage, a pair of magnets are caused to move into engagement with the lead-in wires and draw them away from the exhaust tube. In the second stage, a wedge effects a further separation of the lead-in wires from one another. In the third stage, the lead-in wires are engaged by jaws mounted on the ends of a pair of reciprocating slides which bend the wires to the finally desired position during the return stroke of the reciprocating slides.

Although, in the specific embodiment of the invention illustrated in the accompanying drawing and described below, the lead-in wire orienting operation is performed in three stages, in some cases a three stage operation may be found to be unnecessary. For example, the first stage may be found to be unnecessary in cases where the electrical device does not have an exhaust tube projecting therefrom adjacent to the lead-in wires to be oriented.

Figure 1:
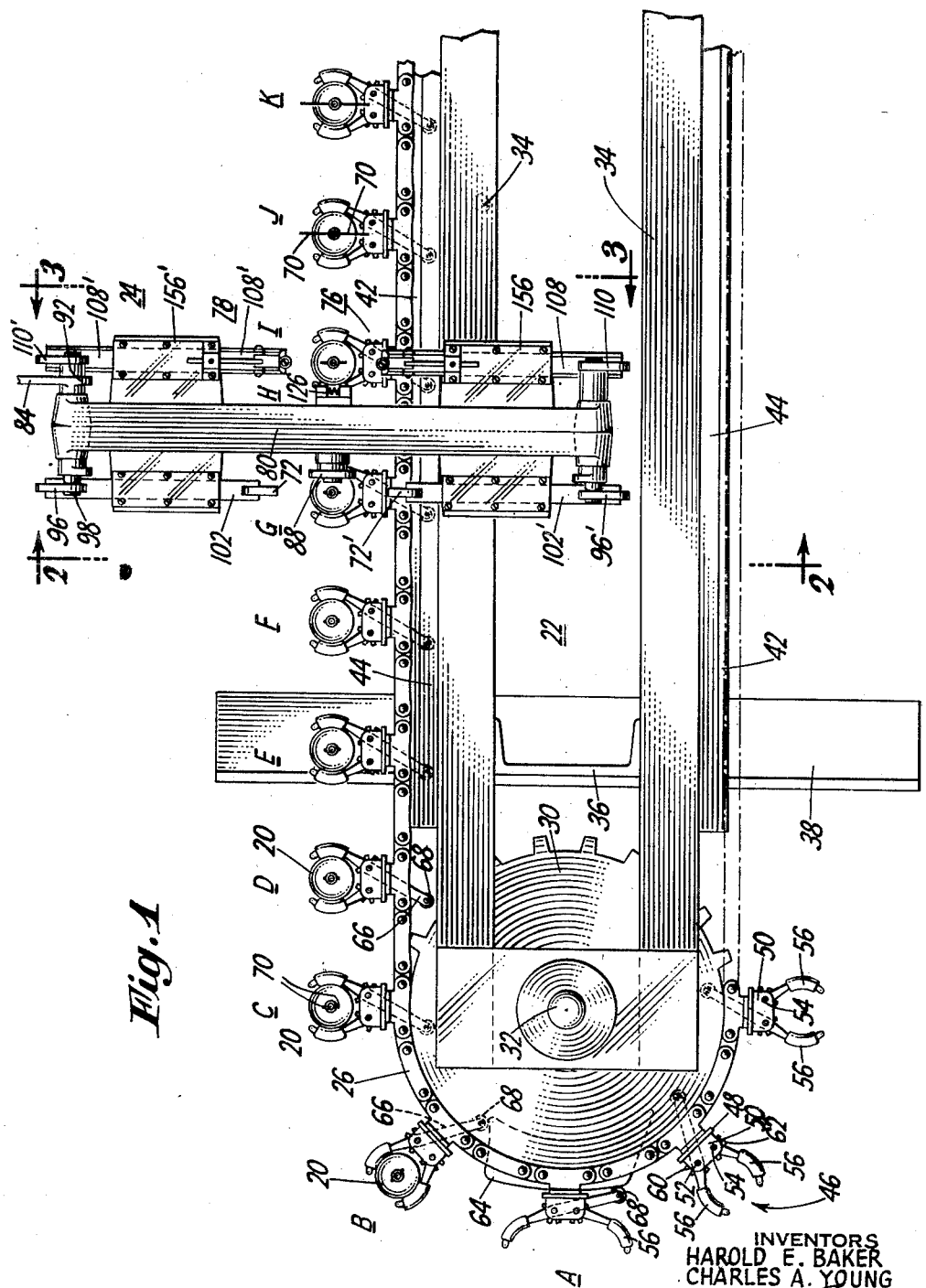
Figure 1 is a plan view of a fluorescent lamp conveyor showing the location of an embodiment of the invention thereon.
Figure 2:
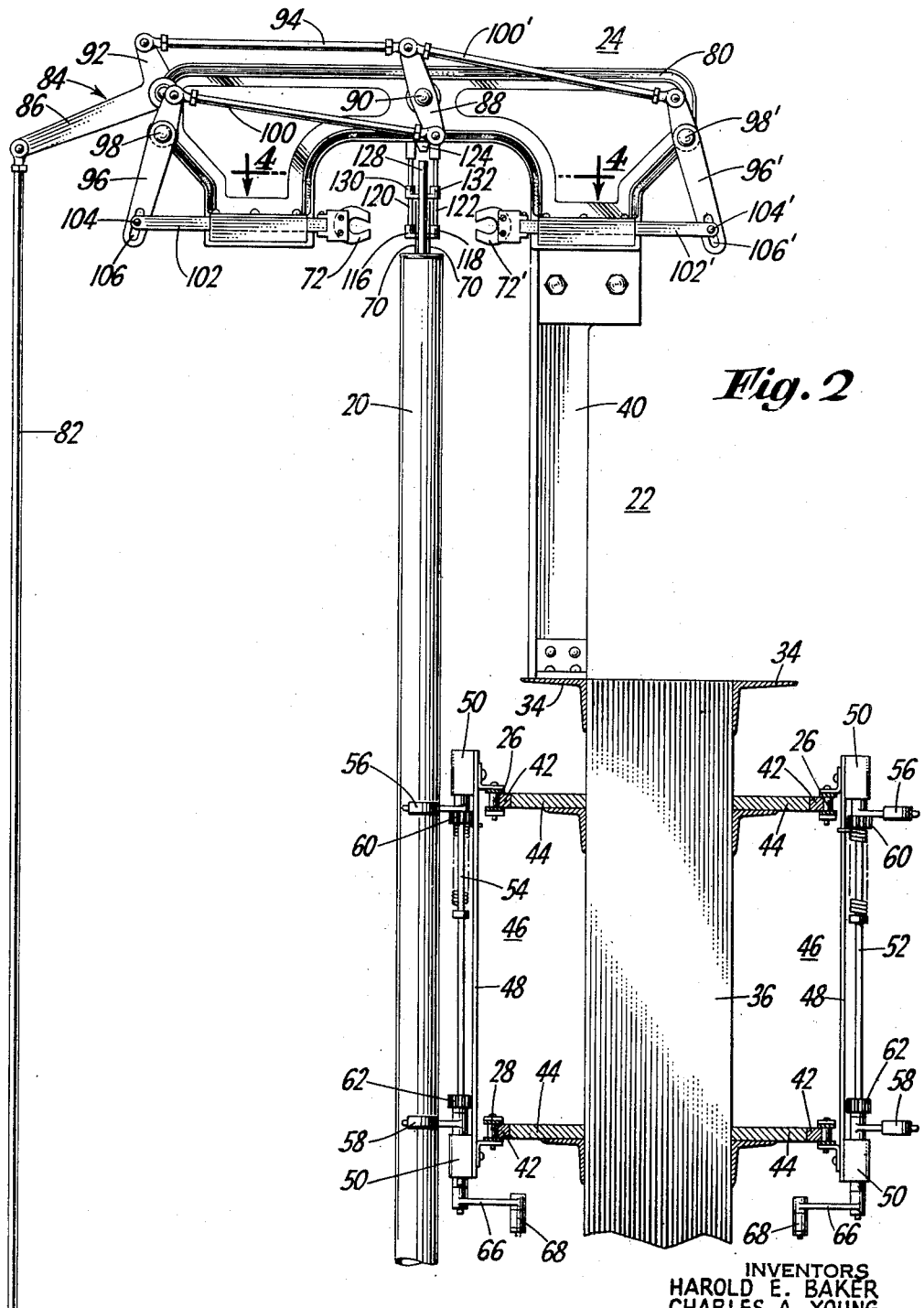
Figure 2 is a side elevational view of the conveyor of Figure 1 looking in the direction indicated by the line 2—2 of Figure 1.

Referring now to Figures 1 and 2 of the drawings, fluorescent lamps 20 are loaded onto a conveyor 22 at station B and carried thereby through a plurality of stations, including stations G, H and I, where a lead-in wire orienting apparatus 24 performs the desired lead-in wire orienting operation. Loading of the lamps 20 onto the conveyor 22 may be done mechanically, such as by means of the apparatus shown in Brooks, Serial Number 135,807, filed December 29, 1949, entitled "Lamp Transfer Apparatus," for example.

The conveyor 22, a major portion of which is shown in Figure 1, comprises a pair of endless link chains 26 and 28 mounted on two pairs of sprocket wheels 30 disposed on shafts 32 located at opposite ends of a pair of spaced, parallel angle bars 34. The angle bars 34 are mounted on standards 36 upstanding on bases 38. The lead-in wire orienting apparatus 24 is mounted on an arm 40 upstanding on one of the angle bars 34. The conveyor 22 is provided with two pairs of rails 42 along which the link chains 26 and 28 ride during the major portion of their linear movement. The rails 42 are attached to the ends of arms 44 mounted on the standards 36. The chains 26 and 28 are driven by a conventional indexing drive mechanism (not shown) connected thereto through the sprocket wheels 30 and shaft 32.

The fluorescent lamps 20 are carried along the conveyor 22 in lamp-holding heads 46. Each head 46 comprises a supporting plate 48 attached to chains 26 and 28, blocks 50 mounted on the plate 48 at the ends thereof, a pair of spaced parallel rods 52 and 54, rod 52 being spring-loaded, supported in the blocks 50, and two pairs of lamp-gripping jaws 56 and 58 mounted on the rods 52 and 54. The rods 52 and 54 have pairs of meshed gears 60 and 62 mounted thereon adjacent to the two pairs of lamp-gripping jaws 56 and 58. Actuation of the two pairs of jaws 56 and 58 to effect an opening and closing thereof to receive and to release a lamp is effected by means of a cam 64 (Fig. 1) fixedly mounted on the conveyor 22, a lever 66 attached to the lower end of the spring-loaded rod 52 and a cam roller 68 disposed on the free end of the lever 66 and engageable with the cam 64. As the cam roller 68 rides over the cam 64, the lever 66 and the rod 52 to which it is attached are rotated clockwise. Clockwise rotation of the rod 52 effects counter-clockwise rotation of the rod 54 through the two pairs of meshed gears 60 and 62. After a lamp has been positioned in the head 46, the cam roller 68 rides off of the cam 64 and the spring-loaded rod 52 effects a closing of the two pairs of jaws 56 and 58 about the lamp through the gears 60 and 62.

Figure 3:
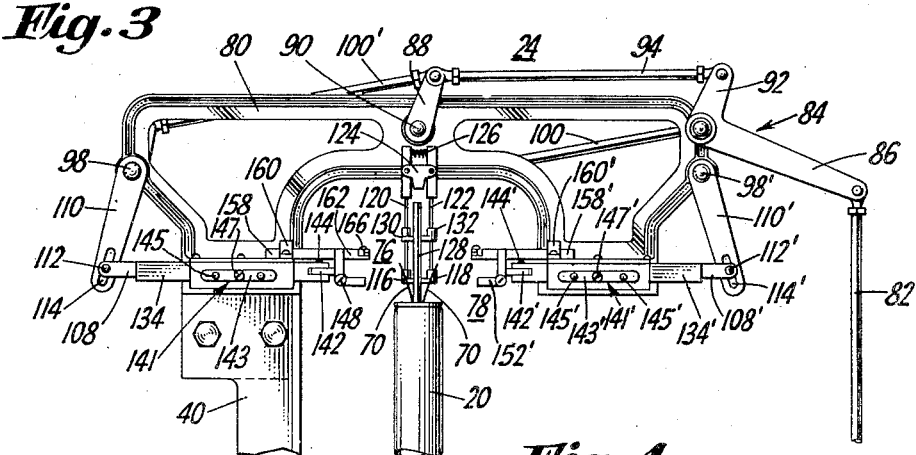
Figure 3 is a side elevational view of an embodiment of the lead-in wire orienting apparatus of this invention looking in the direction indicated by the line 3—3 of Figure 1.
Figure 4:
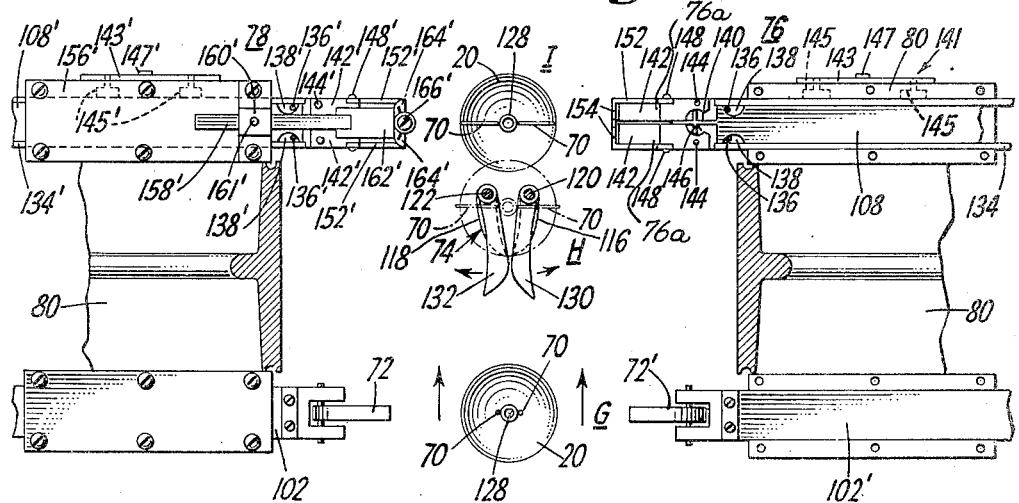
Figure 4 is a plan view of the lead-in wire orienting apparatus shown in the previous figures, with a portion of the frame on which the apparatus is mounted and the actuating mechanism are omitted for clarity of illustration.

As mentioned above, the lead-in wire orienting operation, as illustrated in the specific embodiment thereof in the drawings, is effected in three stages at stations G, H and I on the conveyor 22. Referring now to Figure 4, preliminary separation of lamp lead-in wires 70 is effected at stations G and H by a pair of permanent magnets 72 and a split wedge 74 respectively. Bending of the wires 70 to effect the final positioning thereof is accomplished at station I by two pairs of spring-loaded jaws 76 and 78. These mechanisms for effecting the lead-in wire orienting operation are all mounted on a frame 80 which is attached to the arm 40 upstanding on the angle bar 34 of the conveyor 22 (Figs. 2 and 3). The split wedge 74 is pivotally attached to and depends from the frame 80 whereas the magnets 72 and the two pairs of jaws 76 and 78 are mounted on reciprocating slides, the construction and method of operation of which will now be described.

Referring now to Figures 2 and 3, actuation of the magnets 72 and the two pairs of jaws 76 and 78 of the lead-in wire orienting apparatus 24 is effected by connecting them to the chain indexing drive (not shown) of the conveyor 22 through a connecting rod 82. A bell crank lever 84, mounted on the frame 80, has the upper end of connecting rod 82 connected to arm 86 thereof. A lever 88 (Fig. 2), fulcrumed at 90, is connected to arm 92 of the bell crank lever 84 by a connecting rod 94. A lever 96, fulcrumed at 98, is connected to the lever 88 through connecting rod 100. A similar lever 96', mounted on the opposite end of the frame 80, and fulcrumed at 98', is connected to the lever 88 through connecting rod 100'. Slides 102 and 102' are connected to levers 96 and 96' by means of pins 104 and 104' riding in slots 106 and 106' cut in levers 96 and 96' respectively. The permanent magnets 72 are mounted opposite one another on the free ends of slides 102 and 102'. Referring now to Figure 3, slides 108 and 108' which actuate the two pairs of jaws 76 and 78, are connected to levers 110 and 110', which are fulcrumed at 98 and 98', through pins 112 and 112' and slots 114 and 114' respectively. Thus, a common mechanism is provided for actuating both the magnets 72 and the jaws 76 and 78, with the levers 96 and 96' which actuate the magnet slides 102 and 102', and the levers 110 and 110' which actuate the slides 108 and 108', having a common fulcrum 98 and 98' respectively.

Referring now to Figures 3 and 4, which illustrate the mechanism for effecting the second phase of the lead-in wire orienting operation, the split wedge 74, which spreads the wires 70, consists of two separate cooperating parts, member 116 and member 118. Wedge members 116 and 118 are fixedly mounted on rods 120 and 122 respectively which depend from and are pivotally mounted in a block 124 attached to the frame 80 of the lead-in wire orienting apparatus 24. The adjacent faces of wedge members 116 and 118 are normally maintained in positive engagement with one another by a spring 126 which bridges the rods 120 and 122 at the tops thereof. Since the wedge members 116 and 118 are normally closed to one another, some means must be provided to separate them to permit the passage of a lamp exhaust tube 128 therethrough. This means comprises a pair of normally closed fingers 130 and 132 fixedly mounted on rods 120 and 122 respectively. As a lamp 20 moves from station G to station H (Fig. 4), its exhaust tube 128 engages and effects a separation of the fingers 130 and 132 from contact with one another a distance sufficient for passage of the exhaust tube 128 therethrough. Separation of the fingers 130 and 132 effects a lateral displacement of the rods 120 and 122 and the members 116 and 118 of the split wedge 74 which are mounted thereon, thereby providing for the passage of the exhaust tube 128 therethrough to station H.

The mechanism for effecting the third phase of the lead-in wire orienting operation is illustrated in Figures 3, 4, 8, 9 and 10. Since the mechanisms for effecting the operation of the two pairs of spring-loaded jaws 76 and 78 are identical, they will be described with reference to one pair of jaws only, with similar parts identified with primed reference numbers. In Figure 4, the illustrations of the apparatus at the left at station I is a true plan view whereas the apparatus at the right at station I is a plan view with some of the parts removed to permit illustration of other parts not shown at the left.

Referring now to Figures 3 and 4, the slide 108, which is driven by the lever 110, is disposed within a channel-shaped slide 134. The forward end of slide 134 is provided a pair of pins 136 upstanding thereon which are disposed in cut-outs 138 in the sides of slide 108. The front end of slide 108 is provided with a cross-shaped projection 140. A pair of arms 142 are pivotally mounted at 144 on the front end of slide 134. Each arm 142 is a stepped member having an upper offset portion and a lower offset portion. The adjacent faces of the upper offset portions of the arms 142 are cut away to define a chamber 146 through which the leg of the cross-shaped projection 140 extends and in which the arm thereof is disposed.

A friction device 141, consisting of a strip of spring metal 143 and a pair of brushes 145, is attached to the side of the frame 80. The strip 143 is attached to the frame 80 by a screw 147 and the brushes 145 extend through the frame 80 into frictional engagement with the slide 134. When the slide 108 is driven forward by the lever 110, the arm of the cross-shaped projection 140 pushes against the wall of the chamber 146 and effects a parting of the adjacent faces of the arms 142 pivoting about 144. During this portion of the stroke of the slide 108, the slide 134 is held stationary by the friction device 141 and the cut-outs 138 in the sides of the slide 108 are displaced with reference to the pins 136 upstanding on the slide 134 sufficiently so that the wall thereof moves into engagement with the pins 136. Further forward movement of the slide 108 after the arms 142 have been opened overcomes the restraining influence of the friction device 141 and causes the slide 134 to be carried along therewith.

Referring still to Figures 3 and 4, each jaw of the pair of jaws 76 comprises an L-shaped member pivotally mounted at 148 at the junction of the leg 150 and base 152 thereof and an arm 154 extending transversely thereof from the other end of the base 152. The arms 154 of the pair of jaws 76 extend across the front ends of the arms 142 and the free ends thereof engage one another. A plate 156 attached to the frame 80 covers the slides 108 and 134. An arm 158 is adjustably mounted in a bracket 160 attached to the plate 156 by a set screw 161. The arm 158 has a plate 162 mounted on the end thereof which is disposed above the jaws 76. A pair of spring-loaded fingers 164, pivotally mounted at 166, are located at the forward end of the plate 162 and are engageable by the legs 150 of the jaws 76 during a portion of the stroke of the slides 108 and 134.

The operation of the specific embodiment of the apparatus of this invention will now be described. Referring now to Figures 1 and 2, at station A, the two pairs of jaws 56 and 58 of the lamp-holding head 46 are held open to receive a lamp by the cam 64 through the cam roller 68, lever 66 and the spring-loaded rod 52 on which one jaw of each of the two pairs of jaws 56 and 58 are mounted. As the pair of endless link chains 26 and 28 driven by the sprocket wheels 30, advance the head 46 to station B, a lamp 20 is fed to the head 46 and securely retained therein for effectuation of the lead-in wire orienting operation. As the head 46 approaches station B, the cam roller 68 rides off of the cam 64 and the spring-loaded rod 52 effects a closing of both pairs of jaws 56 and 58 through the gears 60 and 62 on rods 52 and 54 respectively. The lamp is then carried through stations C, D, E and F.

Figure 5:
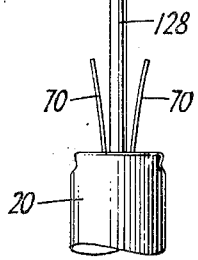
Figure 5 is a fragmentary detail of an end of a fluorescent lamp showing the disposition of the lead-in wires after the first phase of the lead-in wire orienting operation has been performed.

When the lamp reaches station G, the first stage of the lead-in wire orienting operation takes place. At station G, the magnets 72 are caused to move inwardly, engage the wires 70 and return to their position of rest as shown in Figure 2. The strength of the magnets 72 is such that this action on the wires 70 effects a displacement thereof from the position they occupy as shown in Figure 2 to the position shown in Figure 5, i. e., the free ends thereof are displaced a substantial distance from the lamp exhaust tube 128. Actuation of the magnets 72 is effected by the reciprocating stroke of the connecting rod 82 which is connected to and synchronized with the indexing drive (not shown) of the conveyor 22. After the lamp 20 has been moved into station G, the connecting rod 82 is caused to move upwardly. Upward movement of the connecting rod 82 is transmitted through the bell crank lever 84, connecting rod 94, lever 88, connecting rods 100 and 100' and levers 96 and 96' into the forward stroke of the slides 102 and 102' on which the magnets 72 are mounted. After the magnets have engaged the wires 70, the downward movement of the connecting rod 82 effects the return stroke of the slides 102 and 102'.

Figure 6:
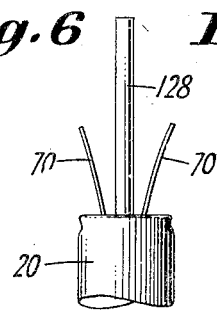
Figure 6 is a fragmentary detail of an end of a fluorescent lamp showing the disposition of the lead-in wires after the second phase of the lead-in wire orienting operation has been performed.

The lamp is then carried to station H where the split wedge 74 (Figs. 2, 3, and 4) effects a further separation of the lead wires 70 from one another to effect a disposition thereof substantially as illustrated in Figure 6. As the lamp 20 moves into station H, its exhaust tube 128 exerts a force against the adjacent faces of the normally closed fingers 130 and 132 sufficient to effect a parting thereof to permit passage of the exhaust tube therethrough. Since the fingers 130 and 132 and the members 116 and 118 of the split wedge 74 are fixedly mounted on the pivotally mounted rods 120 and 122, parting of the adjacent faces of fingers 130 and 132 effects a parting of the adjacent faces of members 116 and 118 of the split wedge 74 to permit passage of the exhaust tube 128 therethrough. As the exhaust tube 128 passes between the adjacent faces of members 116 and 118 of the split wedge 74, the wires 70 of the lamp 20 are further separated from one another by wiping contact with the outer periphery of the members 116 and 118.

Figure 8:
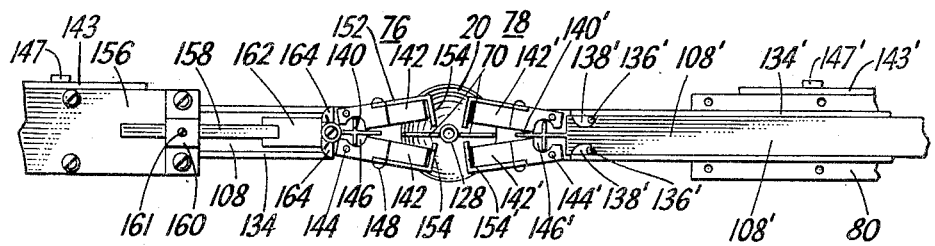
Figure 8 is a detail plan view of the mechanism for effecting the third phase of the lead-in wire orienting operation showing the mechanism in the extended position.
Figure 9:
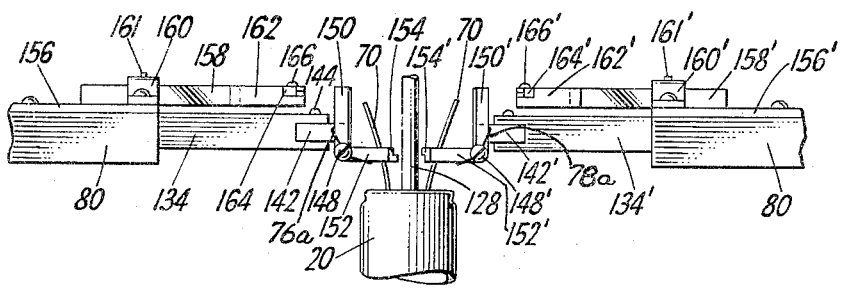
Figure 9 is a detail side elevational view of the mechanism for effecting the third phase of the lead-in wire orienting operation showing the mechanism in the extended position.
Figure 10:
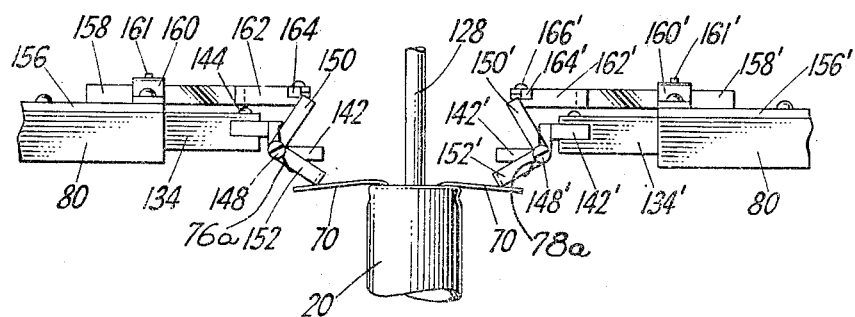
Figure 10 is a detail side elevational view of the mechanism for effecting the third phase of the lead-in wire orienting operation showing the mechanism as it approaches the retracted position on the return stroke.

The lamp is then carried to station I where the final phase of the lead-in wire orienting operation is executed. Referring now to Figures 3 and 4, the two pairs of jaws 76 and 78 are caused to move inwardly and encircle the wires 70 by the upward stroke of the connecting rod 82. The upward stroke of the connecting rod 82 is transmitted to the jaws 76 and 78 through the bell crank lever 84, the connecting rod 94, the lever 88, the connecting rods 100 and 100', the fulcrums 98 and 98', the levers 110 and 110' and the slides 108 and 108'. As the slides 108 and 108' move forward, the cross-shaped projections 140 and 140' on the front ends thereof advance in the chambers 146 and 146', exert a force on the wall thereof and thereby open the arms 142 and 142', pivotally mounted on the slides 134 and 134'. Since the jaws 76 and 78 are mounted on the sides of arms 142 and 142', they also are opened (Fig. 8). This forward movement of slides 108 and 108' effects a displacement of the cut-outs 138 and 138' in the sides thereof sufficient to bring the walls thereof in contact with the pins 136 and 136' upstanding on slides 134 and 134'. Thus, as the slides 108 and 108' continue their inward movement, the slides 134 and 134' are carried therewith. At the completion of the forward stroke, the wires 70 are disposed as shown in Figures 8 and 9, lying between the open arms 142 and 142'.

Figure 7:
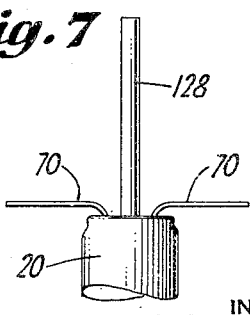
Figure 7 is a fragmentary detail of an end of a fluorescent lamp showing the disposition of the lead-in wires after the third phase of the lead-in wire orienting operation has been performed.

When the connecting rod 82 (Fig. 3) starts its downward movement to effect the return stroke of the slides 108 and 108' and slides 134 and 134', the slides 108 and 108' are first returned a distance sufficient to effect a closing of the arms 142 and 142' and the jaws 76 and 78 (Figs. 4 and 8) by the action of the cross-shaped projections 140 and 140' on the wall of the chambers 146 and 146', after which the pins 136 and 136' bearing against the wall of the cut-outs 138 and 138' cause the slides 134 and 134' to return with the slides 108 and 108'. As these slides return, the bottom edge of the transverse arms 154 and 154' of the closed jaws 76 and 78 (Fig. 9) ride along the wires 70 effecting a further separation and bending thereof. When the legs 150 and 150' of the jaws 76 and 78 strike the spring-loaded fingers 164 and 164' on the fixed plates 162 and 162', the jaws 76 and 78 are rotated about their pivots 148 and 148' (Fig. 10) thereby effecting the final phase of displacement of the wires 70. When the legs 150 and 150' get past the fingers 164 and 164', the springs 76a and 78a return the jaws 76 and 78 to their normal position with the legs 150 and 150' disposed in a vertical plane. This completes the action at station I, with the wires 70 disposed as shown in Figure 7. The lamp 20 is then carried through the succeeding stations, J. K, etc., to a point where it is removed from the conveyor 22, with the lead-in wires 70 properly oriented for succeeding operations.

What we claim is:

1. Apparatus for orienting a lead-in wire of an electrical device comprising: a slide; a pair of jaws pivotally mounted on said slide for rotational movement in a vertical plane; means for opening and closing said pair of jaws in a horizontal plane; means for imparting a reciprocating stroke to said slide to move said pair of jaws into and out of encircling engagement with the wire; and means disposed above and in register with said slide to effect rotational movement of said pair of jaws during the return stroke of said slide to thereby effect a bending of the wire.

2. Apparatus for orienting a lead-in wire of an electrical device comprising: a slide; a pair of arms pivotally mounted on said slide for rotational movement in a horizontal plane, a pair of jaws pivotally mounted on said arms for rotational movement in a vertical plane; a second slide disposed within said first mentioned slide; means on said second mentioned slide for effecting rotation of said pair of arms; means for effecting reciprocating movement of both of said slides to bring said pair of jaws into and out of encircling engagement with the wire; and means disposed above and in register with said pair of slides for effecting rotational movement of said pair of jaws during the return stroke of said slides to thereby effect a bending of the wire.

3. In apparatus for advancing electrical devices, having lead-in wires and an exhaust tube projecting therefrom, to a plurality of work stations, a lead-in wire orienting apparatus disposed transverse to the path through which the electrical devices are caused to travel, said lead-in wire orienting apparatus comprising: a pair of magnets disposed opposite one another at one of said work stations; means for reciprocating said magnets into and out of engagement with the lead-in wires of the electrical devices at said one of said work stations to effect a preliminary separation of the lead-in wires from one another and from the exhaust tube; a wedge disposed at a second of said work stations and in the path traversed by the electrical devices to effect a further separation of the lead-in wires from one another; pairs of jaws disposed opposite one another at a third of said work stations; means for reciprocating said pairs of jaws into and out of encircling engagement with the lead-in wires of the electrical devices at said third of said work stations; and means for rotating said pairs of jaws, in a plane substantially perpendicular to the plane in which said pairs of jaws are reciprocated, during the return stroke thereof to bend the lead-in wires to a final predetermined position.

4. In apparatus for advancing electrical devices, having lead-in wires projecting therefrom, to a plurality of work stations, a lead-in wire orienting apparatus disposed transverse to the path through which the electrical devices are caused to travel, said lead-in wire orienting apparatus comprising: a pair of magnets disposed opposite one another at one of said work stations; means for reciprocating said magnets into and out of engagement with the lead-in wires of an electrical device at said one of said work stations to effect a preliminary separation of the lead-in wires from one another; a wedge disposed at a second of said work stations and in the path traversed by the electrical devices to effect a further separation of the lead-in wires from one another; pairs of jaws disposed opposite one another at a third of said work stations; means for reciprocating said pairs of jaws into and out of encircling engagement with the lead-in wires of an electrical device at said third of said work stations; and means for rotating said pairs of jaws, in a plane substantially perpendicular to the plane in which said pairs of jaws are reciprocated, during the return stroke thereof to effect a bending of the lead-in wires to a final predetermined position.

5. Apparatus for orienting a lead-in wire of an electrical device comprising: a slide; a pair of jaws pivotally mounted on said slide for rotational movement in a vertical plane; means for opening and closing said pair of jaws in a horizontal plane; means for imparting a reciprocating stroke to said slide to move said pair of jaws into and out of encircling engagement with the wire; and means for effecting rotational movement of said pair of jaws in a vertical plane during the return stroke of said slide to thereby effect a bending of the wire.

6. Apparatus for orienting a lead-in wire of an electrical device comprising: a slide; a pair of arms pivotally mounted on said slide for rotational movement in a horizontal plane; a pair of jaws pivotally mounted on said arms for rotational movement in a vertical plane; means for imparting a reciprocating stroke to said slide to move said pair of arms and said pair of jaws into and out of encircling engagement with the wire; means for rotating said pair of arms in a horizontal plane to effect an opening thereof for the reception therebetween of the wire during the forward stroke of said slide; and means for rotating said pair of jaws in a vertical plane during the return stroke of said slide to effect a bending of the wire disposed between the said pair of arms.

CHARLES A. YOUNG
HAROLD E. BAKER.

References Cited in the file of this patent

UNITED STATES PATENTS

| Number | Name | Date |
|---|---|---|
| 263,141 | Edison | Aug. 22, 1882 |
| 1,626,679 | Kelly | May 3, 1927 |
| 1,655,279 | McGowan | Jan. 3, 1928 |
| 2,554,013 | Cooper | May 22, 1951 |

FOREIGN PATENTS

| Number | Country | Date |
|---|---|---|
| 615,889 | Great Britain | Jan. 13, 1949 |